(12) United States Patent
Black et al.

(10) Patent No.: US 8,472,998 B2
(45) Date of Patent: Jun. 25, 2013

(54) SYSTEM AND METHOD FOR ACHIEVING WLAN COMMUNICATIONS BETWEEN ACCESS POINT AND MOBILE DEVICE

(75) Inventors: Gregory R. Black, Vernon Hills, IL (US); Thomas V. D'Amico, Inverness, IL (US); Stephen P. Emeott, Rolling Meadows, IL (US); Brian D. Storm, Round Lake Beach, IL (US)

(73) Assignee: Motorola Mobility LLC, Libertyville, IL (US)

( * ) Notice: Subject to any disclaimer, the term of this patent is extended or adjusted under 35 U.S.C. 154(b) by 512 days.

(21) Appl. No.: 11/469,999

(22) Filed: Sep. 5, 2006

(65) Prior Publication Data

US 2008/0057956 A1 Mar. 6, 2008

(51) Int. Cl.
*H04M 1/00* (2006.01)

(52) U.S. Cl.
USPC .............. 455/552.1; 455/553.1; 455/561; 455/562.1

(58) Field of Classification Search
USPC ............... 455/11.1, 557, 552.1; 370/338, 466
See application file for complete search history.

(56) References Cited

U.S. PATENT DOCUMENTS

| | | |
|---|---|---|
| 4,972,455 A | 11/1990 | Phillips et al. |
| 5,128,925 A | 7/1992 | Dornstetter et al. |
| 5,313,489 A | 5/1994 | Menich et al. |
| 5,402,523 A | 3/1995 | Berg |
| 5,425,030 A | 6/1995 | Comroe et al. |
| 5,428,819 A | 6/1995 | Wang et al. |
| 5,509,035 A | 4/1996 | Teidermann, Jr. et al. |
| 5,974,319 A | 10/1999 | Kotzin et al. |
| 6,574,266 B1 | 6/2003 | Haartsen |
| 6,931,249 B2 | 8/2005 | Fors et al. |
| 6,980,535 B2 | 12/2005 | Bennett |
| 7,010,300 B1 | 3/2006 | Jones et al. |
| 7,126,937 B2 | 10/2006 | Crosbie et al. |
| 7,164,916 B1 * | 1/2007 | Ahnlund et al. .............. 455/437 |
| 7,330,448 B2 * | 2/2008 | Verma et al. .................. 370/331 |

(Continued)

FOREIGN PATENT DOCUMENTS

| | | |
|---|---|---|
| EP | 1303152 A | 4/2003 |
| WO | 0027150 A | 5/2000 |
| WO | 2004066646 A | 8/2004 |

OTHER PUBLICATIONS

A new multiband antenna for WLAN/cellular applications Duxian Liu, Gaucher, B. IBM Thomas J. Watson Res. Center, Yorktown Heights, NY, USA Vehicular Technology Conference, 2004. VTC2004-Fall. 2004 IEEE 60th Publication Date: Sep. 26-29, 2004 vol. 1.*

(Continued)

*Primary Examiner* — Rafael Pérez-Gutiérrez
*Assistant Examiner* — Suhail Khan (57) ABSTRACT

A system and method for achieving wireless local area network (WLAN) communications between an access point and a mobile device are disclosed. In at least some embodiments, the system involves an access point that includes a first transceiver capable of sending and receiving first wireless communication signals in accordance with a WLAN protocol, and a first transmitter capable of sending second wireless communication signals that are cellular/WAN communication signals on a first channel. The second wireless communication signals can be received by a mobile, dual-mode (or multi-mode) wireless communication device such as a cellular telephone and, upon such receipt, WLAN communications can be established and conducted between the access point (or another access point) and the mobile device.

6 Claims, 3 Drawing Sheets

U.S. PATENT DOCUMENTS

| Patent/Publication No. | Date | Name | Class |
|---|---|---|---|
| 7,339,909 B2 * | 3/2008 | Kotzin | 370/331 |
| 7,355,994 B2 * | 4/2008 | Shpak | 370/320 |
| 7,356,015 B2 * | 4/2008 | Ibe et al. | 370/338 |
| 2002/0147008 A1 * | 10/2002 | Kallio | 455/426 |
| 2003/0003951 A1 | 1/2003 | Leprieur et al. | |
| 2003/0058830 A1 | 3/2003 | Schmidt | |
| 2003/0134638 A1 | 7/2003 | Sundar et al. | |
| 2004/0008645 A1 | 1/2004 | Janevski et al. | |
| 2004/0042576 A1 | 3/2004 | Anderson | |
| 2004/0081117 A1 | 4/2004 | Malek et al. | |
| 2004/0147223 A1 | 7/2004 | Cho | |
| 2004/0176024 A1 | 9/2004 | Hsu et al. | |
| 2004/0198221 A1 | 10/2004 | Bin et al. | |
| 2004/0219955 A1 * | 11/2004 | daCosta | 455/574 |
| 2005/0020299 A1 | 1/2005 | Malone et al. | |
| 2005/0059400 A1 | 3/2005 | Jagadeesan et al. | |
| 2005/0094589 A1 | 5/2005 | Camp, Jr. | |
| 2005/0153736 A1 * | 7/2005 | Ganton | 455/553.1 |
| 2005/0201340 A1 | 9/2005 | Wang et al. | |
| 2005/0255892 A1 * | 11/2005 | Wong et al. | 455/562.1 |
| 2006/0013170 A1 | 1/2006 | Shin et al. | |
| 2006/0025138 A1 * | 2/2006 | Kotzin | 455/445 |
| 2006/0039332 A1 * | 2/2006 | Kotzin | 370/338 |
| 2006/0040656 A1 | 2/2006 | Kotzin | |
| 2006/0116127 A1 | 6/2006 | Wilhoite et al. | |
| 2006/0209997 A1 * | 9/2006 | Van Buren et al. | 375/345 |

OTHER PUBLICATIONS

Michel Mouly and Jean-Louis Dornstetter, "The Pseudo-Synchronisation a Costless Feature to Obtain the Gains of a Synchronised Cellular Network", Nov. 1991, pp. 51-55, XP000391318.

* cited by examiner

SYSTEM AND METHOD FOR ACHIEVING WLAN COMMUNICATIONS BETWEEN ACCESS POINT AND MOBILE DEVICE

FIELD OF THE INVENTION

The present invention relates to communication systems, particularly wireless communication systems.

BACKGROUND OF THE INVENTION

Many mobile devices including cellular telephones, handheld devices (e.g., personal digital assistants), and computers such as notebook or laptop computers include wireless transceivers appropriate for establishing connectivity with wireless local area networks (WLANs) using air interfaces such as 802.11, Bluetooth, IrDA, and HomeRF. Additionally, many of these devices, and particularly cellular telephones, currently have dual-mode or even multi-mode communication capabilities insofar as the devices also include transceivers for communicating with cellular networks or other wide-area networks (WANs) using air interfaces such as IS-95 and GSM, CDMA or CDMA2000.

While mobile devices such as the above-mentioned devices tend to continually remain in contact with WANs (e.g., in communication with base stations), those devices often move in and out of the communication ranges of WLANs that are established by access points, which are typically positioned at fixed physical locations. At the same time, it is desirable for mobile devices to be able to seamlessly roam between the WANs and WLANs as WLAN communications become available with movement of the mobile devices. This is true particularly because WAN throughput is often limited and tariffed heavily, while WLANs are often able to provide high throughput with insignificant tariffs, and consequently it can be desirable to choose WLAN communications over WAN communications when the former is available. Further, many WAN services are provided on a contract which does not provide incremental revenue for incremental WAN usage. For this reason as well, WAN operators may prefer to offload communications from the WAN onto WLAN channels whenever possible, especially when the WAN is operating near its channel capacity.

To be able to roam between WLANs and WANs, mobile devices must be able to determine when WLAN communication is possible. Conventional mobile devices accomplish this by continuously looking or scanning for WLAN signals from access points. Although effective in determining the presence of access points, such operation is problematic insofar as it requires that a WLAN scanning receiver subsystem of the mobile device be powered up continuously. Given that mobile devices are battery-powered and consequently have limited operating times proportional to the sizes of batteries utilized, the power drained due to such scanning can significantly reduce the time over which a given mobile device can operate without recharging, or necessitate the use of a larger battery, which can be detrimental to the appearance of the mobile device or render it undesirably heavy or bulky.

In particular with respect to wireless fidelity (Wi-Fi) WLAN communications, access points often provide a beacon signal in the industry, scientific and medical (ISM) band, and mobile devices desirous of establishing communications with those access points must periodically scan for that beacon signal. Again in this particular case, scanning for the beacon signal requires the activation of a Wi-Fi receiver of the mobile device that has a relatively large current drain. Further, even in mobile devices equipped with Wi-Fi chipsets that contain an activity detect signal for triggering scans, the activity detectors are prone to missed detection due to non-Wi-Fi signals, or signals in the ISM band that are not available for access, e.g., signals from personal area networks, remote control devices, FRS (walkie-talkies), radios, microwave ovens, and other devices.

For at least the above reasons, therefore, it would be desirable if an improved system and/or method could be developed for achieving WLAN communications between access points and mobile, dual-mode (or multi-mode) wireless communications devices such as cellular telephones in a manner that did not require the depletion of as much battery power from the mobile devices as in conventional systems. In at least some embodiments, it would be further desirable if such improved system and/or method could allow for relatively rapid discovery of the access points by the mobile devices and commencement of WLAN communications, e.g., under 20 seconds.

BRIEF SUMMARY OF THE INVENTION

The present inventors have recognized the above-described limitations of conventional mobile, dual-mode (or multi-mode) wireless communication devices in attempting to discover WLAN access points (in the Wi-Fi context or otherwise). The present inventors further have recognized that the above-described limitations can be overcome by equipping an access point with a cellular/WAN transmitter by which the access point can transmit a homing signal in the cellular/WAN frequency band (and/or otherwise in accordance with cellular/WAN protocols, modular formats, etc.) for receipt by one or more mobile devices. In at least some embodiments, given the transmission of such a homing signal, the mobile devices then become capable of detecting the presence of the access point (and the WLAN) without needing to activate their WLAN receivers, such that the discovery of the access point by the mobile devices does not require excessive power dissipation on their part.

In at least some embodiments, the present invention relates to an access point that includes a first transceiver capable of sending and receiving first wireless communication signals in accordance with a wireless local area network (WLAN) protocol, and a first transmitter capable of sending second wireless communication signals that are cellular communication signals on a first channel.

Additionally, in at least some embodiments, the present invention relates to a dual-mode wireless communication device. The communication device includes a first transceiver capable of sending and receiving first wireless communication signals in accordance with a wireless local area network (WLAN) protocol, and a second transceiver capable of sending and receiving second wireless communication signals that are cellular communication signals. The dual-mode wireless communication device is configured to determine, based upon at least one of the received second wireless communication signals, a presence of an access point with which the dual-mode wireless communication device is capable of communicating via the first wireless communication signals.

Further, in at least some embodiments, the present invention relates to a method of operating a dual-mode wireless communication device. The method includes (a) receiving a first signal communicated via a first cellular communication channel, the first signal indicating a first presence of a first access point, and (b) upon receiving the first signal, conducting communications with the first access point according to a first wireless local area network (WLAN) protocol.

DETAILED DESCRIPTION OF THE INVENTION

Figure 1:
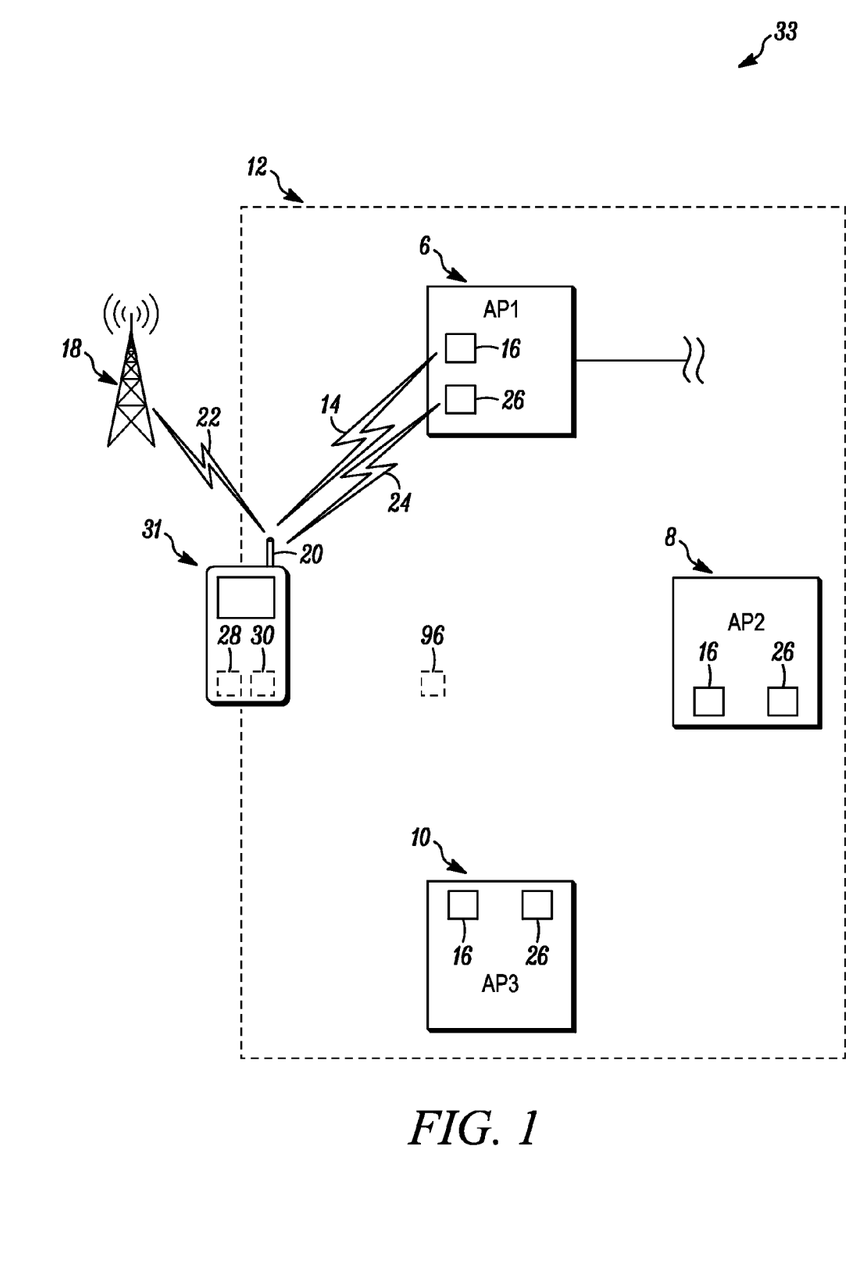
FIG. 1 is a schematic illustration of an exemplary wireless communication system including multiple access points, where one or more of the access points are capable of communicating with an additional wireless communication device (which in this example is a cellular telephone) by way of a cellular/WAN communication signal in addition to WLAN communication signals.

Referring to FIG. 1, an exemplary wireless communication system 33 is shown in schematic form that is intended to be representative of a variety of different wireless communication systems that are encompassed by the present invention. In the present embodiment, the system 33 includes a cellular telephone 31 that is a mobile, dual-mode wireless communication device capable of both cellular or other wide area network (WAN) communication and also wireless local area network (WLAN) communications. While FIG. 1 shows the cellular telephone 31, this device is intended to be representative of a variety of other mobile devices that are capable of dual-mode or multi-mode wireless communications as well, for example, handheld devices (e.g., personal digital assistants) and computers (e.g., laptop or notebook computers).

Further, the wireless communication system 33 includes first, second and third access points 6, 8 and 10, respectively. The access points 6, 8 and 10 as shown in the present embodiment are all located within a certain region 12. The region 12, a perimeter of which is represented by a dashed line, can be, for example, a building such as an office building, factory, hospital, or home within which the access points 6, 8 and 10 are located (in which case the dashed line could be representative of walls of such a building) or, alternatively, simply an open region not defined by any corresponding physical structure. Although the region 12 is shown to be rectangular, this need not be the case in any given other embodiment.

In the present embodiment, the access points 6, 8 and 10 like the cellular telephone 31 are each capable of WLAN communications, that is, configured for sending and receiving first wireless communication signals 14 by way of a WLAN channel or band of frequency spectrum and/or in accordance with a WLAN communication protocol or modulation scheme. For example, in certain embodiments, the access points 6, 8 and 10 can be configured for WLAN communications in accordance with one or more protocols such as IEEE 802.11 (including 802.11(b) or Wi-Fi), BlueTooth protocol, IrDA protocol, HomeRF, etc. To achieve such WLAN communications, each of the access points 6, 8 and 10 has a respective first transceiver 16 allowing for the sending and receiving of the first wireless communication signals 14. In the exemplary embodiment shown, it is the first access point 6 that is shown to be communicating with the cellular telephone 31 by way of the first wireless communication signals 14, although it is to be understood that the other access points 8 and 10 are equally capable of such communications. For simplicity of discussion, it is further assumed that the access points 6, 8 and 10 are capable of WLAN communications within a local region that is coterminous with the region 12, although this need not always be the case.

To achieve dual-mode wireless communications, the cellular telephone 31 includes both a first transceiver 28 and a second transceiver 30. The first transceiver 28 enables the cellular telephone 31 to conduct cellular/WAN communications, e.g., communications over a cellular/WAN channel or band of frequency spectrum and/or in accordance with a WAN communication protocol or modulation scheme such as IS-95, GSM, CDMA or CDMA2000. Among the cellular/WAN communications that are conducted by the cellular telephone 31 are cellular/WAN communication signals 22 that are sent and received with respect to a remote communication terminal such as a base station 18. In contrast, the second transceiver 30 enables the cellular telephone 31 to conduct WLAN communications, e.g., to send and receive the first wireless communication signals 14.

While the cellular telephone 31 during normal operation continuously maintains (or is capable of) cellular/WAN communications with devices/systems such as the base station 18 regardless of physical movement of the cellular telephone, the cellular telephone is capable of WLAN communications with devices such as the access points 6, 8 and 10 only when the cellular telephone 31 is within a physical range or ranges of those devices. In the present embodiment, an antenna 20 of the cellular telephone 31 is shown to be positioned within the region 12 so as to represent a circumstance in which the cellular telephone is within a range of each of the access points 6, 8 and 10. Thus, it is because the cellular telephone 31 is within the range of the access points 6, 8 and 10 that the cellular telephone is capable of sending and receiving the first wireless communication signals 14 in relation to the first access point 6.

In accordance with at least some embodiments of the present invention, each of the first, second and third access points 6, 8 and 10 includes, in addition to its respective first transceiver 16, a respective additional transmitter 26, which in some embodiments can be a transceiver (e.g., be implemented in combination with a receiver). The respective transmitters 26 of the first, second and third access points 6, 8 and 10 are respectively capable of sending second wireless communication signals 24 that can be received by the cellular telephone 31 and serve as homing signals or indicator signals to the cellular telephone that it is within range of the respective access points and consequently that WLAN communications between the cellular telephone and the respective access points is possible. For simplicity, it is presumed that the range of the access points 6, 8 and 10 in transmitting the second wireless communication signals is again coterminous with the region 12, although this need not be the case. Thus, the cellular telephone is able to detect the signals 24 since its antenna 20 is within the region 12. While the additional transmitters 26 in some embodiments can be integrally incorporated within the access points 6, 8 and 10, in other embodiments the additional transmitters can be modular components that can be plugged into or otherwise added onto existing access points. In some cases, the additional transmitters 26 can be purchased as aftermarket components and then installed relative to the access points.

The second wireless communication signals 24, in contrast to the first wireless communication signals 14, are cellular/WAN communication signals similar in nature to the cellular/WAN communication signals 22 occurring between the base station 18 and the cellular telephone 31. As described in further detail below, the particular characteristics of the second wireless communication signals 24 can take various forms depending upon the embodiment. Also as described below, the particular manner in which the cellular telephone 31 processes and/or responds to the received second wireless communication signals 24 also can depend upon the embodiment. In general, the second wireless communication signals 24 allow the cellular telephone 31 to determine whether WLAN communications are possible with one or more access points without having to continuously scan for WLAN signals, and thus allows for the cellular telephone 31 to achieve dual-mode wireless communications using less power than is conventionally required. This is particularly the case since the receiver portion of the first (WAN) transceiver 28 of the cellular telephone 31 uses significantly less power than the receiver portion of the second (WLAN) transceiver 30.

Figure 2:
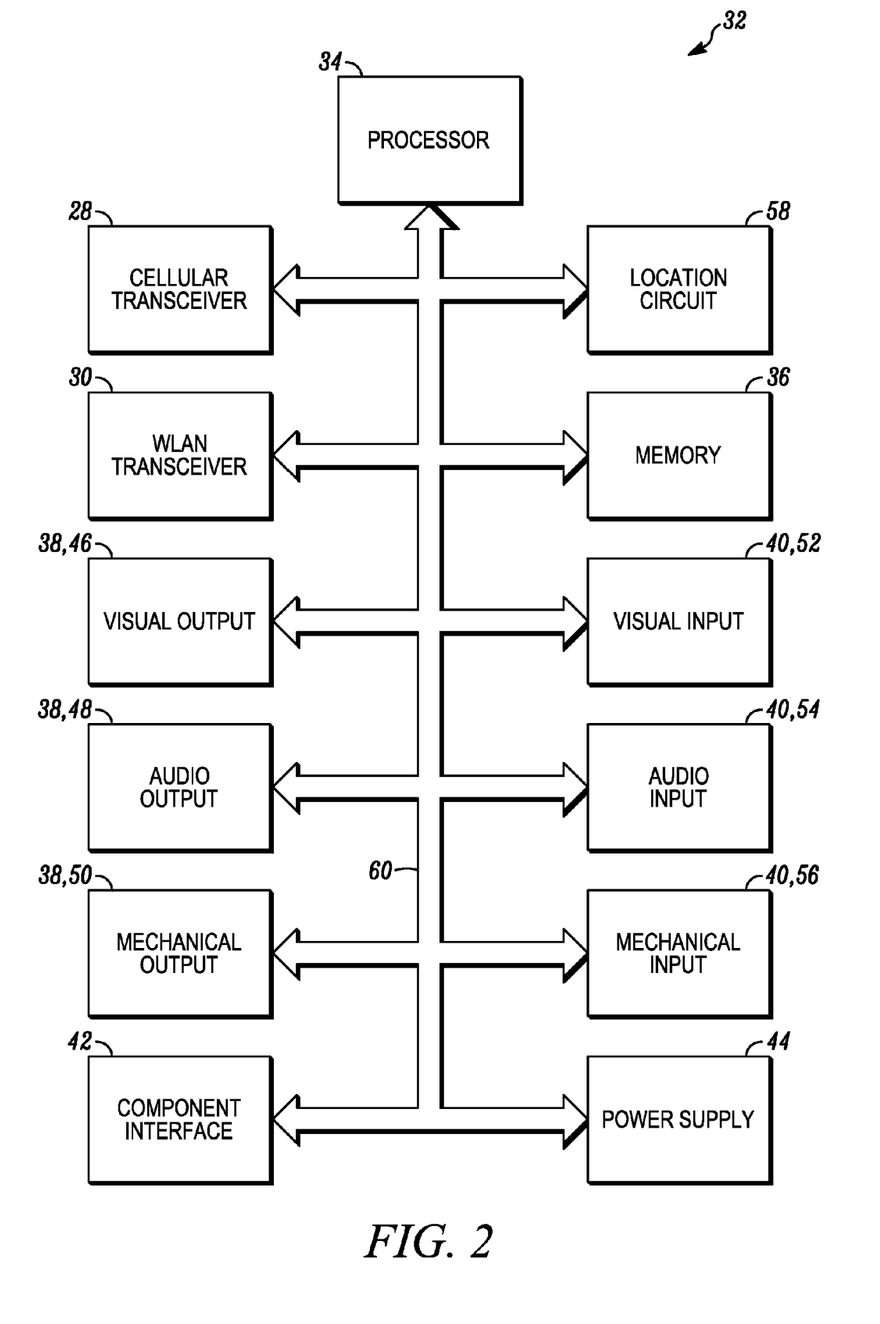
FIG. 2 is a block diagram showing exemplary components of one of the wireless communication devices of FIG. 1.

Turning to FIG. 2, there is provided a block diagram illustrating exemplary internal components 32 of the cellular telephone 4 of FIG. 1. As shown, the internal components 32 of the cellular telephone 4 include a processor 34 and the first and second wireless transceivers 28 and 30 allowing for cellular/WAN and WLAN communications respectively. Additionally, the internal components 32 further include a memory portion 36, one or more output devices 38, and one or more input devices 40. The processor 34 can be any of a variety of different processing devices including, for example, a microprocessor. In at least some embodiments, the internal components 32 include a user interface (not shown) that comprises one or more of the output devices 38 and one or more of the input devices 40. The internal components 32 can further include a component interface 42 to provide a direct connection to auxiliary components or accessories for additional or enhanced functionality. The internal components 32 preferably also include a power supply 44, such as a battery, for providing power to the other internal components while enabling the overall cellular telephone 4 to be portable.

The internal components 32 can operate independently and in conjunction with one another to perform a number of functions. For example, upon receiving wireless signals, the internal components 32 can detect communication signals, and the transceivers 28, 30 in particular are capable of demodulating the communication signals to recover incoming information, such as voice data and/or other data, transmitted by the wireless signals. After receiving the incoming information from one or more of the transceivers 28, 30, the processor 34 formats the incoming information for the one or more output devices 38 and/or for storage in the memory portion 36. Similarly, for transmission of wireless signals, the processor 34 formats outgoing information, which can (but need not) be activated by the input devices 40, and conveys the outgoing information to one or more of the transceivers 28, 30 for modulation to communication signals.

Further as shown in FIG. 2, the input and output devices 38, 40 of the internal components 32 can include a variety of types of visual, audio and/or mechanical input and output devices. For example, the output device(s) 38 can include a visual output device 46 such as a liquid crystal display or a light emitting diode indicator, an audio output device 48 such as a speaker, alarm and/or buzzer, and/or a mechanical output device 50 such as a vibrating mechanism. Likewise, by example, the input devices 40 can include a visual input device 52 such as an optical sensor (for example, a camera), an audio input device 54 such as a microphone, and a mechanical input device 56 such as a flip sensor, keyboard, keypad, selection button, touch pad, touch screen, capacitive sensor, motion sensor, and switch.

Actions that actuate one or more of the input devices 40 can include, but are not limited to, opening of the cellular telephone, unlocking the phone, moving the phone to actuate a motion, moving the phone to actuate a location positioning system, pressing of a button on the phone, and operating the phone. Additionally as shown in FIG. 2, the internal components 32 can also include a location circuit 58. Examples of the location circuit 58 include, but are not limited to, a Global Positioning System (GPS) receiver, a triangulation receiver, an accelerometer, a gyroscope, or any other information-collecting device that can identify a current location of the cellular telephone 4 (or of one or more of its internal components 32).

The memory portion 36 of the internal components 32 can include any number of a variety of different types of memory devices such as random access memory (RAM) devices, and can be used to store and retrieve data. Typically, although not necessarily, operation of the memory portion 36 in storing and retrieving data is governed by commands from the processor 34. The data that is stored by the memory portion 36 can include, but need not be limited to, operating systems (or other systems software), applications, and data. Each operating system in particular includes executable code that controls basic functions of the cellular telephone 4, such as interaction among the various internal components 32, communication with external devices via the transceivers 28, 30 and/or the component interface 42, and storage and retrieval of applications and data to and from the memory portion 36.

As for the applications, each application includes executable code that operates in conjunction with the operating system to provide more specific functionality for the cellular telephone 4, such as file system service and handling of protected and unprotected data stored in the memory portion 36. As for the data that is potentially stored in the memory portion 36, such data can include, for example, non-executable code or information that can be referenced and/or manipulated by an operating system or application for performing functions of the cellular telephone 4. Further for example, the data can include files having data with any of a variety of formats, purposes, types or uses including, for example, audio files, photographic or image files, text files, or other data files. The various internal components 32 are shown to be coupled by way of an internal bus 60, albeit the components can be coupled in any of a variety of manners by way of any of a variety of connection devices or structures.

Although particularly intended to be representative of the internal components of the cellular telephone 4, the block diagram of FIG. 2 likewise is also representative of the internal components of other devices as well. More particularly, the internal components 32 shown in FIG. 2 are also representative of internal components that can be found in other mobile dual-mode wireless communication devices such as handheld devices and computers. Indeed, the internal components 32 are further representative of the components found in the access points 6, 8 and 10, e.g., with the first (cellular/WAN) transceiver 28 of FIG. 2 corresponding to the transmitters 26 of the access points, and with the power supply 44 being understood to be typically a utility power supply (e.g., with the access points being plugged into wall outlets) rather than a battery.

Figure 3:
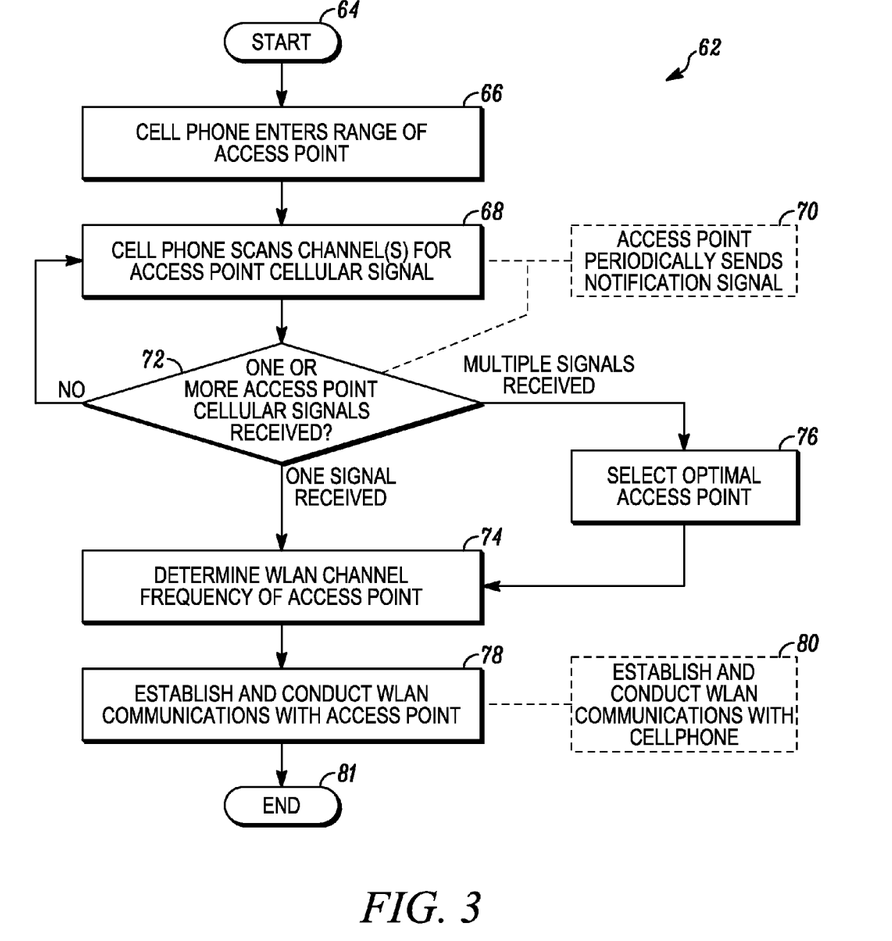
FIG. 3 is a flow chart showing exemplary steps of operation of the cellular telephone that is in communication with one of the access points of FIG. 1.

Turning to FIG. 3, a flow chart 62 is provided showing exemplary steps of operation of the wireless communication system 33 of FIG. 1 in establishing and conducting WLAN communications between the cellular telephone 31 and one of the access points 6. As shown, upon starting operation at a step 64, the cellular telephone 31 physically enters the range of the access point 6, e.g., is transported into the region 12 shown in FIG. 1. While this is happening, the cellular telephone 31 scans one or more appropriate cellular/WAN channels to determine whether any of the second wireless communication signals 24 are being communicated from any access points such as the access points 6, 8 and 10. Although this is shown in the flow chart 62 as occurring as a step 68 subsequent to the step 66 at which the cellular telephone enters the range of the access point(s), it will be understood that the cellular telephone typically is performing this scanning operation at all times, even when the cellular telephone is outside of the range of any access points.

While the cellular telephone 31 is performing the scanning, one or more of the access points 6 may be periodically sending the second wireless communication signals 24, as indicated by way of a step 70 shown in dashed lines. Upon scanning for the second wireless communication signals 24 at the step 68, the cellular telephone 31 determines whether one or more of the second wireless communication signals from one or more of the access points such as the access points 6, 8 and 10 have been received, at a step 72. If no such signals have been received, then the cellular telephone 31 returns to the scanning operation at the step 68. However, if one or more such signals have in fact been received by the cellular telephone 31, then the cellular telephone proceeds to either a step 74 or a step 76.

More particularly, if one signal is received from a single access point such as the access point 6, then the cellular telephone 31 proceeds to a step 74, at which it determines a WLAN channel or frequency band of the access point from which it has received the second wireless communication signal. Alternatively, if multiple signals are received from multiple access points (e.g., two or more of the access points 6, 8 and 10), then the cellular telephone 31 first proceeds to a step 76, at which it selects a preferred or optimal one (or possibly more than one) of the access points that transmitted the second wireless communication signals as being the access point(s) with which the cellular telephone will conduct WLAN communications. Upon making this determination, then the cellular telephone 31 again proceeds to step 74 at which it determines the appropriate WLAN channel (or possibly multiple channels) of the selected access point (or access points).

Upon determining the channel or frequency band at step 74, at a step 78 the cellular telephone 31 then establishes and conducts WLAN communications with the access point (or possibly with multiple access points) by way of the first wireless communication signals 14. The conducting of such communications typically requires repeated interactions between the cellular telephone 31 and the access point(s) of interest, both in first establishing the communication link and then in further conducting ongoing communications. For example, in initially establishing communications between the cellular telephone 31 and a given access point such as the access point 6, the cellular telephone and the access point can exchange handshaking signals (e.g., WLAN probe request and probe response signals). Thus, the flow chart 62 also shows, in dashed lines at a step 80, that the access point 6 performs operations complementary to those of the cellular telephone 31 being performed at the step 78, for the purpose of establishing and conducting the WLAN communications. Finally, once WLAN communications are proceeding, the routine illustrated by the flowchart 62 is completed at an end step 81.

Although not shown in the flowchart 62, it will be further understood that during normal operation the cellular telephone 31 typically communicates by way of cellular/WAN communications at least prior to and subsequent to the occurrence of the WLAN communications, or alternatively at all times including simultaneously while the WLAN communications are occurring. In embodiments where the cellular telephone 31 switches between WAN and WLAN communications, the cellular telephone typically turns on the WLAN transceiver 30 and also turns off the cellular/WAN transceiver 28 after receiving one or more of the second wireless communication signals 24 from one or more of the access points 6, 8 and 10 at the step 72. Likewise, once the WLAN communications are completed, the cellular telephone 31 can turn back on the cellular/WAN transceiver 28 and turn off the WLAN transceiver 30.

Figure 4:
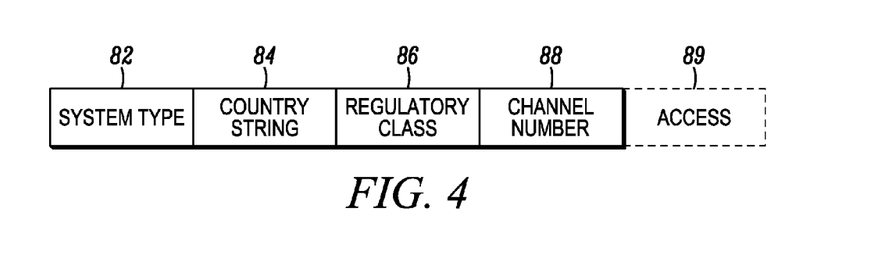
FIG. 4 is a schematic illustration of exemplary types of information that can be provided by one of the access points of FIG. 1 in its cellular/WAN communication signal, in at least some embodiments.

Referring additionally to FIG. 4, the exact information provided in the second wireless communication signals 24 provided by the transmitters 26 of the access points 6, 8 and 10 can vary depending upon the embodiment, as can the operation of the cellular telephone 31 (or other mobile device) upon receiving the second wireless communication signals. In one embodiment shown in FIG. 4, the second wireless communication signals 24 provided by the transmitters 26 have four portions of information, namely, system type information 82, country string information 84, regulatory class information 86, and channel number information 88. The system type information 82 represents the type of system that is communicating the information (e.g., a WLAN-capable device), while the country string information 84 can be a three-octant string identifying a country or non-country entity in which the access point is operating. The regulatory class information 86 can be a single octant of information specifying an applicable regulatory class (e.g., IEEE 802.11 Annex J), while the channel number information can be a single octant of information specifying a channel. Based upon these four types of information 82-88, the cellular telephone 31 is able to determine the particular WLAN channel or frequency band of the access point that has sent the second wireless communication signal 24.

In an additional embodiment, the four types of information 82, 84, 86 and 88 are accompanied by a fifth type of information that is access information 89, as shown by a box in dashed lines in FIG. 4. Such access information can be employed in certain circumstances by a mobile device such as the cellular telephone 31 in establishing communications with an access point, e.g., as part of the step 78 shown in FIG. 3. For example, in some embodiments, upon receiving the access information, the cellular telephone 31 is required to send the information back to an access point as it attempts to establish communications with that access point before WLAN communications can be conducted. Also for example, in some embodiments, upon receiving the access information, the cellular telephone 31 can compare the received access information with information obtained elsewhere in an effort to determine whether the cellular telephone actually has rights to access the access point and/or the WLAN. For example, the cellular telephone 31 could compare the received access information with corresponding information stored in its memory 36.

An exemplary circumstance in which the cellular telephone 31 (or other mobile device) might operate according to the latter scenario is one in which a WAN operator is providing the WLAN for the purpose of off-loading communication traffic from the WAN to the WLAN (or for other reasons), and the WAN operator desires that the WLAN access be limited to users of the operator's choosing. In such circumstances, the access information can take the form of a network operator identity, for example, the access information can include one or more Public Land Mobile Network (PLMN) codes. Upon detecting one of the second wireless communication signals 24 having such PLMN code information, the cellular telephone can compare the received PLMN code information with stored PLMN information of the operator for which there is a service agreement (e.g., the WAN provider), and further determine based upon this comparison whether the received PLMN code information matches the stored information and thus whether the WLAN is accessible. In the case of a GSM WAN provider in particular, the stored PLMN information can be included as part of the International Mobile Subscriber Identity (IMSI) information from the service provider, and is stored in the memory 36 or other part of the cellular telephone (e.g., in a subscriber identity module (SIM)).

While FIG. 4 shows the information that can be included within the second wireless communication signals 24 in some embodiments, in other embodiments, less or more information is provided. For example, in some alternate embodiments, much less or even virtually no information is provided in the second wireless communication signals 24. Upon receiving such a signal, the cellular telephone 31 is able to determine or simply presume a given WLAN channel (e.g., at the step 74 of the flow chart 62) not based upon the information received but rather because the channel(s) used by the access points 6, 8 and 10 have been dedicated for the purpose of sending the second wireless communication signals. For example, a cellular operator can purposefully set aside one or more channels in a geographic area for use by one or more access points to announce their presence to roaming dual-mode wireless communication devices.

In still other alternate embodiments, if a given access point sending the second wireless communication signals 24 knows the channel number(s) of one or more neighboring access points, that given access point can transmit within the second wireless communication signals a list of several channel numbers instead of merely its own channel number. In such cases, the cellular telephone would have the option to choose to conduct WLAN communications with any of the access points for which channel number information was available, rather than merely the access point from which the cellular telephone had received the channel number information. In further alternate embodiments, a given access point is capable of transmitting multiple signals in several cellular channels where the channel number of any given cellular channel corresponds to a WLAN regulatory class or channel number and thus suggests the channel number or frequency.

Additionally, in some embodiments in which the amount of information provided by way of the second wireless communication signals 24 from an access point is small, such that the signals only serve to indicate the presence of the access point and not much else, the cellular telephone 31 upon receiving that information will not be able to immediately identify the channel frequency of the access point but rather will need to perform an additional scan and/or send additional signals to identify the appropriate channel of the access point. In this regard, the present invention for example is intended to encompass embodiments in which the cellular telephone 31 is capable of determining the presence of one or more access points through a combination of attempting to sense WLAN communication signals as in conventional systems, and attempting to detect cellular/WAN signals provided by access points as described above.

Although FIG. 1 shows an embodiment in which each of the available access points 6, 8 and 10 is equipped with its own additional transmitter 26 for transmitting its secondary wireless communication signals 24, this need not be the case in other embodiments. For example, in some embodiments, only one or more of the available access points will have a transmitter for transmitting the secondary wireless communication signals 24, and others of the access points will not have their own dedicated transmitters. Further, in other embodiments, rather than being incorporated into (or co-located with) one or more access points, the transmitters 26 instead are located elsewhere independent of (albeit typically physically proximate to) the access points. For example, referring again to FIG. 1, in one alternate embodiment a single transmitter 96 (shown with dashed lines) located apart from the access points 6, 8 and 10 but still within the region 12 (e.g., within the same enterprise within which are located the access points) is employed instead of the three transmitters 26 co-located with those access points.

In such alternate embodiments in which not every access point is equipped with its own additional transmitter for sending the second wireless communication signals 24, or in which such transmitter(s) are positioned apart from the access points, one or more of the available transmitter(s) can operate as shared or "umbrella" transmitters that are associated with one or more of the access points. That is, a given umbrella transmitter such as the transmitter 96 of FIG. 1 can be configured to send out second wireless communication signals that are suitable for allowing WLAN communications to be established between mobile devices such as the cellular telephone 31 and any one or more of the access points with which the transmitter(s) are associated, e.g., the access points 6, 8 and 10. In some such embodiments, the umbrella transmitter(s) will send out as part of the second wireless communication signals a list of the channel numbers of the multiple access points with which those transmitter(s) are associated. Also, in some embodiments, one or more of the access points are completely oblivious to the existence and activities of the transmitter(s) in providing the secondary wireless communication signals that allow for mobile devices to enter into WLAN communications with those access points.

A factor that should be considered in designing/configuring the operation of the cellular telephone 31 and access points 6, 8 and 10 of FIG. 1, or other dual-mode wireless communication devices employed in other embodiments of the invention, is possible interference with the operation of the regular cellular network (e.g., interference with the cellular communication signals 22 of FIG. 1). Avoidance of such interference can be achieved, in at least some embodiments, by dedicating one or more cellular/WAN channels for use by access points in transmitting the second wireless communication signals 24 as mentioned above. This is not practically problematic, since cellular providers typically own the rights for transmission with these bands.

Alternatively, avoidance of such interference can be achieved by selecting an appropriate transmit frequency and an appropriate power level. For example, cellular mobile transmit frequencies can be employed in communicating the second wireless communication signals 24 of the access points 6, 8 and 10. Transmission at these frequencies will not cause interference to arise in the cellular/WAN transceiver 28 of the cellular telephone 31, since cellular telephone receivers are designed to be able to operate in close proximity to cellular telephones that may be transmitting. Further, interference with the receiver of any base station such as the base station 18 is avoided by employing reduced levels of power, assuming that the access point is not co-located with the base station.

In at least some embodiments, to avoid interference between an access point and a base station, the minimum distance from the access point to the base station should be approximately five times the distance between the access point and the cellular telephone (at the edge of the access point hotspot). If the base station is closer than this, it is still possible for the second wireless communication (homing) signals to be used, but then the channel of those signals should be de-located for cellular operation (e.g., one or more channels should be dedicated for the sending of those signals). It should further be noted that power loss versus distance rolls off more steeply at longer distances due to effects of building penetration, earth curvature and atmospheric refraction, and so the above 5:1 ratio may vary depending upon the particular situation.

Additionally, in preferred embodiments of the invention, the channels/frequency bands used for transmission of the second wireless communication signals 24 are set so as to eliminate the need for any modifications to the cellular telephone 31 (or other mobile wireless communication device) in terms of the design of its cellular/WAN receiver 28. By appropriately selecting the frequency band for the second wireless communication signals (the homing signals), there is no need to extend the band capability of the receiver 28 to receive an out-of-band homing signal from the access points. For example, in one exemplary design, the frequency range(s) of the homing signals are set to correspond to overlap bands in existing tri-band or quad-band cellular telephones without hardware modification, e.g., with the frequency range of the homing signals being set to 880-894 MHz for systems in Europe and Asia, and the frequency range of the homing signals being set to 1850-1880 MHz for systems in North and South America. These choices of frequency also ensure that access point homing signals will not interfere with mobile terminal receivers, since the homing signals occurring within a given geographical region are at a frequency band that is within a receive band of the mobile device that has been allocated to other geographic regions.

A further factor that should be considered in designing/configuring the operation of the cellular telephone 31 and access points 6, 8 and 10 of FIG. 1, or other dual-mode wireless communication devices employed in other embodiments of the invention, is the possibility of mobile interference. That is, in designing the system 2, consideration should be given to the possibility of interference resulting from the operation of the cellular telephone 31 on the same channel as that on which the access points 6, 8 and 10 are transmitting the second wireless communication signals 24, which can result in false detection by the cellular telephone of the presence of one or more of the access points. For example, for mobile devices having single channel separation (e.g., 200 KHz offset), the onset of interference occurs at a separation of 20 to 400 meters depending upon the linking conditions. The distance drops very rapidly with increasing frequency spacing; for example, the onset of interference occurs in the range 4 to 80 meters with 2 channel separation, 3 to 50 meters with 3 channel separation, etc. Such interference in general can be avoided or minimized by using prearranged timeslots, and/or channel frequencies or hopping sequences, and/or by modulating the second wireless communication signals with prearranged data sequence(s) that identify the signals as access point homing signals.

It is specifically intended that the present invention not be limited to the embodiments and illustrations contained herein, but include modified forms of those embodiments including portions of the embodiments and combinations of elements of different embodiments as come within the scope of the following claims.

We claim:

1. A dual-mode wireless communication device comprising:
   a first transceiver capable of sending and receiving first wireless communication signals to and from a particular WLAN access point in accordance with a wireless local area network (WLAN) protocol; and
   a second transceiver capable of sending and receiving second wireless communication signals that are cellular communication signals to and from the particular WLAN access point, wherein each of the received WLAN access point cellular signals corresponds to one of a plurality of WLAN access points,
   wherein the second transceiver scans one or more cellular/WAN channels to determine whether any of the second wireless communication signals, that are cellular communication signals, are being communicated from any WLAN access point, and
   wherein the dual-mode wireless communication device is configured to determine, based upon the second wireless communication signals received directly from the particular WLAN access point, a presence of the particular WLAN access point from the plurality of WLAN access points with which the dual-mode wireless communication device is capable of communicating via the first wireless communication signals.

2. The dual-mode wireless communication device of claim 1, wherein the dual-mode wireless communication device is further configured to determine a channel over which communications with the particular WLAN access point are possible; and
   wherein the second transceiver is capable of receiving the second wireless communication signals on at least a first channel and a second channel.

3. The dual-mode wireless communication device of claim 1, further comprising a microprocessor and a memory device, wherein the WLAN protocol is a wireless fidelity (Wi-Fi) protocol, and wherein the device is selected from the group consisting of a cellular telephone, a computer, and a handheld device.

4. The dual-mode wireless communication device comprising the dual-mode wireless communication device of claim 1, and further comprising each of the particular WLAN access point and an additional transmitter located either at the particular WLAN access point or within a region proximate to the particular WLAN access point, wherein the additional transmitter sends the second wireless communication signals.

5. The dual-mode wireless communication device of claim 1, wherein at least one signal of the second wireless communication signals received by the second transceiver includes system type information representing that a WLAN access point is communicating the second wireless communication signal.

6. The dual-mode wireless communication device of claim 1, wherein at least one signal of the second wireless communication signals received by the second transceiver includes channel number information specifying a WLAN channel or frequency band of the WLAN access point.

* * * * *